United States Patent
Kim et al.

(10) Patent No.: US 7,842,417 B2
(45) Date of Patent: Nov. 30, 2010

(54) ELECTROLYTE FOR LITHIUM ION RECHARGEABLE BATTERY AND LITHIUM RECHARGEABLE BATTERY INCLUDING THE SAME

(75) Inventors: Jinsung Kim, Yongin-si (KR); Yongshik Kim, Yongin-si (KR); Jinbum Kim, Yongin-si (KR); Narae Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 67 days.

(21) Appl. No.: 11/882,655

(22) Filed: Aug. 3, 2007

(65) Prior Publication Data

US 2008/0241670 A1 Oct. 2, 2008

(30) Foreign Application Priority Data

Mar. 27, 2007 (KR) .................. 10-2007-0029928

(51) Int. Cl.
*H01M 6/16* (2006.01)
(52) U.S. Cl. .................. 429/188; 429/199; 429/200
(58) Field of Classification Search .............. 429/12–46
See application file for complete search history.

(56) References Cited

U.S. PATENT DOCUMENTS

| | | | |
|---|---|---|---|
| 5,352,548 A | 10/1994 | Fujimoto et al. | |
| 5,529,859 A * | 6/1996 | Shu et al. .................. 429/331 |
| 5,712,059 A | 1/1998 | Barker et al. | |
| 5,714,281 A | 2/1998 | Naruse et al. | |
| 6,010,806 A | 1/2000 | Yokoyama et al. | |
| 6,048,637 A | 4/2000 | Tsukahara et al. | |
| 6,114,070 A | 9/2000 | Yoshida et al. | |
| 6,699,998 B2 | 3/2004 | Hamamoto et al. | |
| 6,919,145 B1 | 7/2005 | Kotato et al. | |
| 7,074,523 B2 | 7/2006 | Arai et al. | |
| 2001/0053485 A1 | 12/2001 | Shibuya et al. | |
| 2005/0031963 A1* | 2/2005 | Im et al. .................. 429/332 |
| 2006/0003232 A1 | 1/2006 | Jung et al. | |
| 2006/0154149 A1* | 7/2006 | Arai et al. .................. 429/332 |

FOREIGN PATENT DOCUMENTS

| | | |
|---|---|---|
| JP | 05-325985 | 12/1993 |
| JP | 2000-138071 | 5/2000 |
| JP | 2001-006729 | 1/2001 |
| JP | 2004319317 A * | 11/2004 |
| JP | 2007-042329 | 2/2007 |
| KR | 10-2001-0098895 A | 11/2001 |
| KR | 10-2006-0001743 A | 1/2006 |
| KR | 10-2007-0005340 A | 1/2007 |

* cited by examiner

*Primary Examiner*—Dah-Wei D Yuan
*Assistant Examiner*—Kwang Han
(74) *Attorney, Agent, or Firm*—Lee & Morse P.C.

(57) ABSTRACT

An electrolyte for a lithium ion rechargeable battery, including a lithium salt, a non-aqueous organic solvent, a dihalogenated ethylene carbonate, and a halogenated ethylene carbonate. The electrolyte may include about 0.01 to about 2 weight % of the dihalogenated ethylene carbonate, and the electrolyte may include about 0.1 to about 10 weight % of the halogenated ethylene carbonate.

18 Claims, 1 Drawing Sheet

ELECTROLYTE FOR LITHIUM ION RECHARGEABLE BATTERY AND LITHIUM RECHARGEABLE BATTERY INCLUDING THE SAME

BACKGROUND OF THE INVENTION

1. Field of the Invention

Embodiments relate to an electrolyte for a lithium ion rechargeable battery and a lithium ion rechargeable battery including the same. More particularly, embodiments relate to an electrolyte having superior durability and low temperature discharge, and a lithium ion rechargeable battery including the same.

2. Description of the Related Art

With the rapid development of electronics, communication and computer industries, machines are becoming smaller, lighter and more intelligent, portable electronic products, e.g., camcorders, cellular phones, notebook PCs, etc., are becoming generally used, and the demand for light, durable and highly reliable batteries is increasing. When compared with other types of rechargeable batteries, e.g., nickel-cadmium (Ni—Cd) batteries, nickel-hydrogen (Ni-MH) batteries, etc., rechargeable lithium batteries may have approximately 3 times higher energy density per unit weight and may be capable of boosting charge. Research and development of the rechargeable lithium batteries thus actively proceeds.

During discharge of a lithium rechargeable battery, a terminal voltage may be up to about 3.7 V, which may be higher than that of other rechargeable batteries, e.g., alkaline batteries, Ni-MH batteries, Ni—Cd batteries, etc. Thus, it may be possible to get a high discharge voltage from the lithium rechargeable battery. In order to have such a high discharge voltage, an electrochemically-stable electrolyte, e.g., an electrolyte that is stable over the range of about 0-4.2V, which may be the charge/discharge voltage zone, may be important. Thus, a non-aqueous electrolyte may be used for the lithium rechargeable battery.

Thus, there is a need for an electrolyte having the desired characteristics of electrochemical stability, long lifetime, high ion conductivity, high permittivity, low viscosity, good low temperature discharge, safety, and low price.

SUMMARY OF THE INVENTION

Embodiments are therefore directed to an electrolyte for a lithium ion rechargeable battery and a lithium ion rechargeable battery including the same, which substantially overcome one or more of the problems due to the limitations and disadvantages of the related art.

It is therefore a feature of an embodiment to provide an electrolyte for a lithium ion rechargeable battery and a lithium ion rechargeable battery including the same, which may exhibit an improved lifetime.

It is therefore a feature of another embodiment to provide an electrolyte for a lithium ion rechargeable battery and a lithium ion rechargeable battery including the same, which may exhibit good low-temperature discharge characteristics.

At least one of the above and other features and advantages of the embodiments may be realized by providing an electrolyte for a lithium ion rechargeable battery, including a lithium salt, a non-aqueous organic solvent, a dihalogenated ethylene carbonate, and a halogenated ethylene carbonate. The electrolyte may include about 0.01 to about 2 weight % of the dihalogenated ethylene carbonate, and the electrolyte may include about 0.1 to about 10 weight % of the halogenated ethylene carbonate.

The electrolyte may include about 0.5 to about 1.5 weight % of the dihalogenated ethylene carbonate. The electrolyte may include about 3 to about 5 weight % of the halogenated ethylene carbonate. The dihalogenated ethylene carbonate may be difluoroethylene carbonate. The halogenated ethylene carbonate may be fluoroethylene carbonate. The lithium salt may be $LiPF_6$. A weight ratio of the dihalogenated ethylene carbonate to the halogenated ethylene carbonate may be about 1:1 to 1:10.

The dihalogenated ethylene carbonate may be a compound of Structure 2:

[Structure 2]

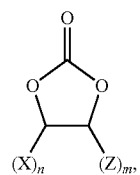

where X and Z may be independently Cl, F, Br or I, and n and m may be independently 1 or 2.

The halogenated ethylene carbonate may be a compound of Structure 1:

[Structure 1]

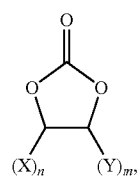

where X may be Cl, F, Br or I, Y is H, and n and m may be independently 1 or 2.

At least one of the above and other features and advantages of the embodiments may also be realized by providing a lithium ion rechargeable battery, including an anode having an anode-active material, a cathode having a cathode-active material, and a housing enclosing an electrolyte, the anode and the cathode, the electrolyte including a lithium salt, a non-aqueous organic solvent, a dihalogenated ethylene carbonate, and a halogenated ethylene carbonate. The electrolyte may include about 0.01 to about 2 weight % of the dihalogenated ethylene carbonate, and the electrolyte may include about 0.1 to about 10 weight % of the halogenated ethylene carbonate.

The electrolyte may include about 0.5 to about 1.5 weight % of the dihalogenated ethylene carbonate. The electrolyte may include about 3 to about 5 weight % of the halogenated ethylene carbonate. The dihalogenated ethylene carbonate may be difluoroethylene carbonate. The halogenated ethylene carbonate may be fluoroethylene carbonate. The lithium salt may be $LiPF_6$. A weight ratio of the dihalogenated ethylene carbonate to the halogenated ethylene carbonate may be about 1:1 to 1:10.

The dihalogenated ethylene carbonate may be a compound of Structure 2:

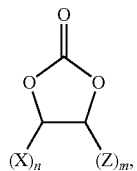

[Structure 2]

where X and Z may be independently Cl, F, Br or I, and n and m may be independently 1 or 2.

The halogenated ethylene carbonate may be a compound of Structure 1:

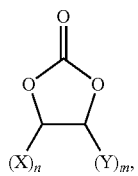

[Structure 1]

where X may be Cl, F, Br or I, Y is H, and n and m may be independently 1 or 2.

At least one of the above and other features and advantages of the embodiments may also be realized by providing a method of preparing an electrolyte for a lithium ion rechargeable battery, the method including combining a lithium salt, a non-aqueous organic solvent, a dihalogenated ethylene carbonate, and a halogenated ethylene carbonate. The electrolyte may include about 0.01 to about 2 weight % of the dihalogenated ethylene carbonate, and the electrolyte may include about 0.1 to about 10 weight % of the halogenated ethylene carbonate.

At least one of the above and other features and advantages of the embodiments may also be realized by providing a method of forming a lithium ion rechargeable battery, the method including enclosing an electrolyte, an anode having an anode-active material and a cathode having a cathode-active material in a housing, the electrolyte including a lithium salt, a non-aqueous organic solvent, a dihalogenated ethylene carbonate, and a halogenated ethylene carbonate. The electrolyte may include about 0.01 to about 2 weight % of the dihalogenated ethylene carbonate, and the electrolyte may include about 0.1 to about 10 weight % of the halogenated ethylene carbonate.

BRIEF DESCRIPTION OF THE DRAWINGS

The above and other features and advantages will become more apparent to those of ordinary skill in the art by describing in detail example embodiments with reference to the attached drawings, in which.

DETAILED DESCRIPTION OF THE INVENTION

Figure 1:
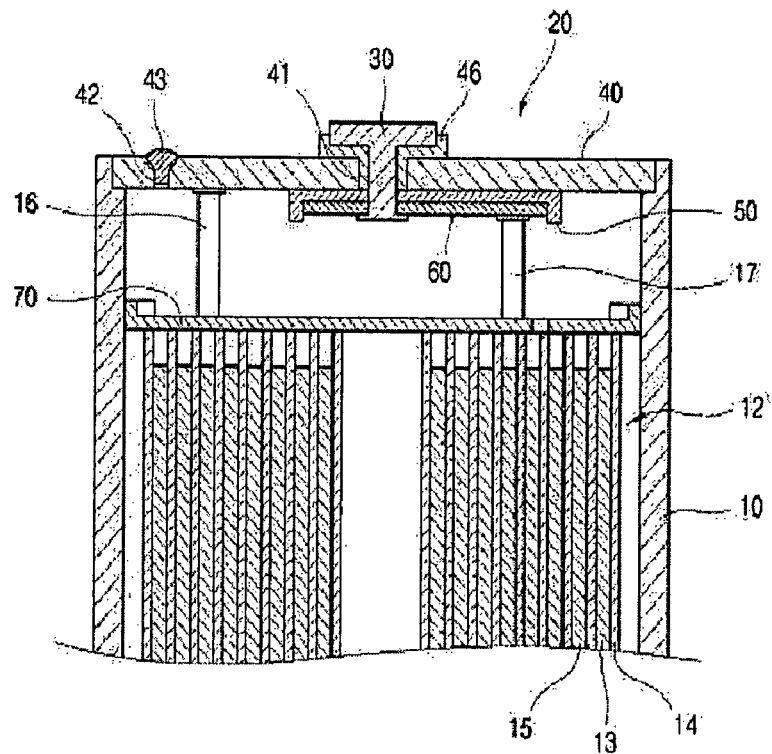
FIG. 1 illustrates a cross-sectional view of an upper part of a prismatic lithium rechargeable battery according to an example embodiment.

Korean Patent Application No. 10-2007-0029928, filed on Mar. 27, 2007, in the Korean Intellectual Property Office, and entitled: "Electrolyte for Lithium Ion Rechargeable Battery and Lithium Ion Rechargeable Battery Comprising the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include a fourth member, whereas the expression "at least one selected from the group consisting of A, B, and C" does not.

As used herein, the expression "or" is not an "exclusive or" unless it is used in conjunction with the term "either." For example, the expression "A, B, or C" includes A alone; B alone; C alone; both A and B together; both A and C together; both B and C together; and all three of A, B and, C together, whereas the expression "either A, B, or C" means one of A alone, B alone, and C alone, and does not mean any of both A and B together; both A and C together; both B and C together; and all three of A, B and C together.

As used herein, the terms "a" and "an" are open terms that may be used in conjunction with singular items or with plural items. For example, the term "a halogenated ethylene carbonate" may represent a single compound, e.g., fluoroethylene carbonate, or multiple compounds in combination, e.g., fluoroethylene carbonate mixed with chloroethylene carbonate.

An embodiment relates to an electrolyte for a lithium rechargeable battery, which may have a superior lifetime characteristic. The electrolyte may have superior discharge at low temperatures, i.e., a superior low temperature storage characteristic. The electrolyte may include a lithium salt, a non-aqueous organic solvent, a halogenated ethylene carbonate, and a dihalogenated ethylene carbonate.

The lithium salt, which may function as a source of lithium ions for the battery, may support a fundamental functioning of the lithium battery. The non-aqueous organic solvent may function as a medium through which the ions associated in the electrochemical reaction of the battery may move.

A compound of the following Structure 1 may be employed as the halogenated ethylene carbonate.

[Structure 1]

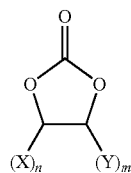

In Structure 1, X may be F, Cl, Br, or I, Y may be H, and n and m may independently be 1 or 2. For example, in an implementation, fluoroethylene carbonate, using fluorine as the halogen atom, may be used.

A compound of the following Structure 2 may be used as the dihalogenated ethylene carbonate.

[Structure 2]

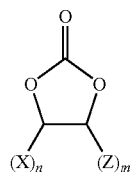

In Structure 2, X and Z may independently be F, Cl, Br or I, and n and m may independently be 1 or 2. For example, in an implementation, difluoroethylene carbonate, using fluorine as both the halogen atoms, may be used.

As used herein, when referring to the dihalogenated ethylene carbonate and the halogenated ethylene carbonate, the term "weight %" will be understood to be a weight % based on the weight of the non-aqueous organic solvent, unless specified otherwise. That is, when referring to the dihalogenated ethylene carbonate and the halogenated ethylene carbonate, the term "weight %" means "weight %, based on 100 weight % of the non-aqueous organic solvent."

The amount of dihalogenated ethylene carbonate may be about 0.01 to about 2 weight %, and that of halogenated ethylene carbonate may be about 0.1 to about 10 weight %. The mixture of dihalogenated ethylene carbonate and halogenated ethylene carbonate in these ranges may provide superior lifetime characteristics and discharge characteristics at low temperatures. Although tiny amounts of dihalogenated ethylene carbonate may provide considerable effects, it may be desirable to use about 0.1 to about 2 weight % thereof.

The weight ratio of the dihalogenated ethylene carbonate to the halogenated ethylene carbonate in the electrolyte may be, e.g., about 1:1 to about 1:10. As the amount of the dihalogenated ethylene carbonate with respect to the halogenated ethylene carbonate increases, the low temperature discharge characteristic of the electrolyte may drop. However, if they are added together in a ratio of, e.g., about 1:1 to about 1:10, the lifetime characteristic and discharge characteristic at a low temperature may be improved. Using about 10% or more, e.g., to about 100%, of the dihalogenated ethylene carbonate with respect to the halogenated ethylene carbonate may improve the discharge characteristic at a low temperature. More than 100% of the dihalogenated ethylene carbonate with respect to the halogenated ethylene carbonate may reduce efficiency and may exhibit a saturation effect, i.e., may provide diminishing returns, with respect to improving discharge characteristics at low temperature. Further, the dihalogenated ethylene carbonate may be more expensive than the halogenated ethylene carbonate. Accordingly, it may be preferable to increase the amount of the halogenated ethylene carbonate, rather than the dihalogenated ethylene carbonate.

An increased amount of either the dihalogenated ethylene carbonate or the halogenated ethylene carbonate alone in the electrolyte may cause the low temperature discharge characteristic of the electrolyte to drop. However, if the dihalogenated ethylene carbonate and the halogenated ethylene carbonate are added together at a total predetermined amount, the lifetime characteristic and discharge characteristic at a low temperature may be improved, particularly within a certain range, as compared to a case where a same total predetermined amount of only one of the carbonates is added.

The employment of only dihalogenated ethylene carbonate in the electrolyte may provide only a low discharge characteristic at low temperatures, and may provide limited lifetime characteristics, e.g., less than 300 cycles (charges/discharges). The employment of only halogenated ethylene carbonate may provide good lifetime characteristics for the battery, when added at high amounts, but at such amounts the discharge characteristics at low temperatures may deteriorate. For example, with 15 weight % of halogenated ethylene carbonate, a discharge capacity at a temperature of −20° C. may be significantly reduced.

The lithium salt may include one or more of, e.g., $LiPF_6$, $LiBF_4$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlO_4$, $LiAlCl_4$, LiCl, LiI, etc. The concentration of the lithium salt may be, e.g., about 0.6 M to about 2.0 M, based on the volume of the non-aqueous organic solvent. In an implementation, the concentration of the lithium salt may be about 0.7 M to about 1.6 M. Using more than about 0.6 M may avoid significantly decreasing the conductivity of the electrolyte, which could degrade the performance of the electrolyte. Using less than about 2.0 M may avoid significantly increasing the viscosity of the electrolyte, which could reduce the mobility of lithium ions.

The non-aqueous organic solvent may include one or more of, e.g., a carbonate, an ester, an ether, a ketone, etc. When a carbonate solvent is employed as the non-aqueous organic solvent, it may be employed as a mixture of, e.g., a cyclic carbonate with a linear and/or branched chain carbonate. The cyclic carbonate and linear and/or branched chain carbonate may be mixed in a volume ratio of, e.g., about 1:1 to about 1:9. In an implementation, the volume ratio may be about 1:1.5 to about 1:4 of cyclic carbonate:linear and/or branched chain carbonate. Utilization of these ratios may result in an electrolyte having superior properties.

The cyclic carbonate may be, e.g., ethylene carbonate (EC), propylene carbonate (PC), 1,2-butylene carbonate, 2,3-butylene carbonate, 1,2-pentylene carbonate, 2,3-pentylene carbonate, etc. Ethylene carbonate and propylene carbonate both may have high permittivity. Ethylene carbonate has a high melting point and, thus, it may be desirable to mix it with another solvent. If graphite is used as a cathode-active material, propylene carbonate, which has a low decomposition voltage, may be omitted or may be added in lesser amounts.

The linear and/or branched chain carbonate may include one or more of, e.g., dimethyl carbonate (DMC), diethyl carbonate (DEC), dipropyl carbonate (DPC), methylpropyl carbonate (MPC), ethylmethyl carbonate (EMC), ethylpropyl carbonate (EPC), etc. Among them, low viscosity compounds may be more useful, e.g., DMC, EMC, DEC, etc.

The ester may include one or more of, e.g., methyl acetate, ethyl acetate, propyl acetate, methyl propionate, ethyl propionate, γ-butyrolactone, γ-valerolactone, γ-caprolactone, δ-valerolactone, ε-caprolactone, etc. The ether may include one or more of, e.g., tetrahydrofuran, 2-methylhydrofuran, dibutylether, etc. The ketone may include, e.g., polymethylvinyl ketone, etc.

In an implementation, the carbonate solvent may be combined with an aromatic hydrocarbon organic solvent in the electrolyte. The aromatic hydrocarbon organic solvent may include a compound of the following Structure 3.

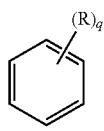

[Structure 3]

In Structure 3, R may be a halogen, or a straight- or branched-chain alkyl group having a carbon number of 1 to about 10. In Structure 3, q, i.e., the number of R groups attached to the aromatic ring, may be 0 to 6. The aromatic hydrocarbon organic solvent may include one or more of, e.g., benzene, fluorobenzene, bromobenzene, chlorobenzene, toluene, o-xylene, m-xylene, p-xylene, mesitylene, etc. When the volume ratio of carbonate solvent to aromatic hydrocarbon organic solvent in an electrolyte including the aromatic hydrocarbon organic solvent is about 1:1 to 30:1, the electrolyte may display superior stability, safety, ion conductivity, etc.

An embodiment relates to a lithium rechargeable battery. The lithium rechargeable battery may include an anode and a cathode. The anode or cathode may be formed by mixing an electrode-active material, a binder, a conductive agent, and a stabilizer, if necessary, in a solvent, thereby producing a battery slurry composition. The slurry composition may be coated on an electrode collector. Aluminum or aluminum alloy may be employed as an anode collector. Copper or copper alloy may be employed as a cathode collector. The anode collector and the cathode collector may independently be, e.g., foil, mesh-shaped, etc.

The anode may include an anode-active material capable of lithium intercalation/deintercalation. The anode-active material may include one or more of, e.g., Co, Mn, Ni, etc., and complex metal oxide with lithium. The ratio of metals may be varied. In addition to the above metals, other elements, e.g., Mg, Al, K, Na, Ca, Si, Ti, Sn, V, Ge, Ga, B, As, Zr, Cr, Fe, Sr, rare earth elements, etc., may be included.

The cathode may include a cathode-active material capable of lithium ion intercalation/deintercalation. In an implementation, the cathode may include, e.g., lithium metals, alloys of lithium and another element, etc. Elements that form an alloy with lithium may include one or more of, e.g., Al, Zn, Bi, Cd, Sb, Si, Pb, Sn, Ga, In, etc. In an implementation, the cathode-active material may include one or more carbonaceous materials, e.g., crystalline carbon, amorphous carbon, carbon complex, carbonaceous fiber, etc. The amorphous carbon may include, e.g., hard carbon, cokes, mesocarbon microbeads (MCMB) plasticized under 1500° C., mesophase pitch-based carbon fiber (MPCF), etc. The crystalline carbon may be a graphitic material, e.g., natural graphite, graphitic cokes, graphitic MCMB, graphitic MPCF, etc. In the above carbonaceous materials, a d002 interplanar distance may be about 3.35 Å to about 3.38 Å, and Lc (crystallite size) by X-ray diffraction may be more than about 20 nm.

The binder may make the electrode-active material into paste, may bind active materials with each other, may bind the active material with the collectors, and may buffer the expansion and contraction of the electrode-active material. The binder may include one or more of, e.g., polyvinylidenefluoride (PVDF), polyhexafluoropropylene-polyvinylidenefluoride copolymer, poly(vinylacetate), polyvinylalcohol, polyethyleneoxide, polyvinylpyrrolidone, alkylated polyethyleneoxide, polyvinylether, poly(methylmethacrylate), poly(ethylacrylate), polytetrafluoroethylene, polyvinylchloride, polyacrylonitrile, polyvinylpyridine, styrene-butadiene rubber (SBR), acrylonitrile-butadiene rubber, etc. The content of the binder may be about 0.1 to 30 weight %, based on 100 weight % of the electrode-active material, preferably 1 to 10 weight %. An adequate content of binder may impart sufficient adhesive strength between the electrode-active material and the collectors. If the amount of binder used is large, the adhesive strength may improve, but it may be necessary to decrease the total amount of the electrode-active material in order to accommodate the increased amount of binder, which may reduce the battery capacity.

The conductive agent may be a material that improves electrical conductivity, and may include one or more of, e.g., a graphitic agent, a carbon-black agent, a metal, a metallic compound agent, etc. The graphitic agent may be, e.g., artificial graphite, natural graphite, etc. The carbon-black agent may be, e.g., acetylene black, ketjen black, denka black, thermal black, channel black, etc. The metallic or metallic compound agent may include, e.g., one or more perovskite materials such as Sn, $SnO_2$, $SnPO_4$, $TiO_2$, $KTiO_3$, $LaSrCoO_3$, $LaSrMnO_3$, etc. The content of the conductive agent may be, e.g., about 0.1 to about 10 weight %, based on 100 weight % of the electrode-active material. Maintaining the content of the conductive agent greater or equal to about 0.1 weight % may result in a superior electrochemical characteristic. An optimal energy density per weight may be found when the content of the conductive agent is equal to or less than about 10 weight %.

The stabilizer may be employed to adjust the viscosity of the electrode-active material and slurry. The stabilizer may include one or more of, e.g., carboxylmethyl cellulose, hydroxymethyl cellulose, hydroxyethyl cellulose, hydroxypropyl cellulose, etc.

As the solvent, non-aqueous solvent or aqueous solvent may be employed to mix the electrode-active material, the binder and the conductive agent. The non-aqueous solvent may include one or more of, e.g., N-methyl-2-pyrrolidone (NMP), dimethylformamide (DMF), dimethylacetamide, N,N-dimethylaminopropylamine, ethylene oxide, tetrahydrofuran (THF), etc.

The lithium rechargeable battery may include a separator that serves to prevent a short circuit between the anode and the cathode while allowing for the passage of lithium ions therethrough. The separator may be made from, e.g., a polyolefin polymer film such as polypropylene, polyethylene, polyethylene/polypropylene/polyethylene, polypropylene/polyethylene/polypropylene or other multilayer films, microporous films, woven fabrics, non-woven fabrics, etc. A porous polyolefin film coated with a stable resin may also be employed as the separator.

FIG. 1 illustrates a cross-sectional view of an upper part of a prismatic lithium rechargeable battery according to an example embodiment. Referring to FIG. 1, the lithium rechargeable battery may include an electrode assembly 12 containing an anode 13, a separator 14, and a cathode 15 inserted into a housing 10 along with the above-described electrolyte. An upper part of the housing 10 may be sealed with a cap assembly 20. The cap assembly 20 may include a cap plate 40, an insulating plate 50, a terminal plate 60 and an electrode terminal 30. The cap assembly 20 may be combined with an insulating case 70, thereby sealing the housing 10.

The electrode terminal 30 may be inserted into a terminal passage hole 41 which may be at a center of the cap plate 40. When the electrode terminal 30 is inserted, a tube-shaped gasket 46 may be combined on an external surface of the electrode terminal 30, and may be inserted together with the electrode terminal 30 to insulate the electrode terminal 30 from the cap plate 40. After the cap assembly 20 is assembled on the upper part of the housing 10, the electrolyte may be injected through an electrolyte injection hole 42, and the electrolyte injection hole 42 may be sealed by a cap 43. The electrode terminal 30 may be connected to a cathode tap 17 of the cathode 15 or an anode tap 16 of the anode 13, and may function as a cathode terminal or an anode terminal, respectively.

In addition to the illustrated prismatic, or square-shaped, battery, the shape of the lithium rechargeable battery may be other suitable shapes such as a cylinder, a pouch, a button, etc.

The following Examples and Comparative Examples are provided in order to set forth particular details of one or more embodiments. However, it will be understood that the embodiments are not limited to the particular details described.

The Examples and Comparative Examples employed, as the non-aqueous organic solvent, a mixture of ethylene carbonate, ethyl methyl carbonate, and dimethyl carbonate, which were mixed at a volume ratio of 1:1:1. A stock electrolyte base solution ("stock solution") was prepared by dissolving the lithium salt $LiPF_6$ in the 1:1:1 non-aqueous organic solvent to produce a lithium ion concentration of 1 M (1 mole/liter), based on the volume of the 1:1:1 non-aqueous organic solvent.

Considering that any suitable lithium salt may be dissolved to make the lithium ion concentration to be about 1 M, a stock solution may be formed by dissolving an adequate amount of a suitable lithium salt in the basic solvent so as to yield a lithium ion concentration of about 1 M, or any other suitable concentration.

Example 1

$LiCoO_2$ as an anode-active material, PVDF as a binder and carbon as a conductive agent were mixed in a weight ratio of 92:4:4 and then dispersed in NMP, thereby producing an anode slurry. Then, the slurry was coated on aluminum foil having a 15 μm thickness, dried and rolled, thereby producing an anode.

Artificial graphite as a cathode-active material, SBR as a binder and carboxymethyl cellulose as a stabilizer were mixed in a weight ratio of 96:2:2, and then dispersed in water, thereby producing a cathode-active material slurry. The slurry was coated on copper foil having a 10 μm thickness, dried and rolled, thereby producing a cathode.

Between the electrodes, a film separator made of polyethylene (PE) having a 20 μm thickness was inserted, wound and pressed to be inserted into a prismatic battery housing. Then, the electrolyte was inserted into the housing, thereby producing a lithium rechargeable battery.

The electrolyte was made by dissolving $LiPF_6$ in the 1:1:1 non-aqueous organic solvent to make a 1 M stock solution, as described above, and then, for Example 1, adding 0.5 weight % of difluoroethylene carbonate and 1 weight % of fluoroethylene carbonate to the stock solution, where the weight % of the difluoroethylene and fluoroethylene carbonates were based on the weight of the 1:1:1 non-aqueous organic solvent alone, i.e., excluding $LiPF_6$.

Example 2

Example 2 was prepared in the same manner as Example 1, except for the addition of 0.5 weight % of difluoroethylene and 10 weight % of fluoroethylene carbonate to the stock solution.

Example 3

Example 3 was prepared in the same manner as Example 1, except for the addition of 1 weight % difluoroethylene carbonate and 3 weight % fluoroethylene carbonate to the stock solution.

Example 4

Example 4 was prepared in the same manner as Example 1, except for the addition of 1 weight % of difluoroethylene carbonate and 5 weight % of fluoroethylene carbonate to the stock solution.

Example 5

Example 5 was prepared in the same manner as Example 1, except for the addition of 1 weight % of difluoroethylene carbonate and 7 weight % of fluoroethylene carbonate to the stock solution.

Example 6

Example 6 was prepared in the same manner as Example 1, except for the addition of 2 weight % of difluoroethylene carbonate and 3 weight % of fluoroethylene carbonate to the stock solution.

Example 7

Example 7 was prepared in the same manner as Example 1, except for the addition of 2 weight % of difluoroethylene carbonate and 5 weight % of fluoroethylene carbonate to the stock solution.

Comparative Example 1

Comparative Example 1 was prepared in the same manner as Example 1, except that 3 weight % of difluoroethylene carbonate was added to the stock solution and fluoroethylene was not added.

Comparative Example 2

Comparative Example 2 was prepared in the same manner as Example 1, except that difluoroethylene carbonate was not added and 3 weight % fluoroethylene carbonate was added to the stock solution.

Comparative Example 3

Comparative Example 3 was prepared in the same manner as Example 1, except that difluoroethylene carbonate was not added and 5 weight % of fluoroethylene carbonate was added to the stock solution.

Comparative Example 4

Comparative Example 4 was prepared in the same manner as Example 1, except for the addition of 0.1 weight % of difluoroethylene carbonate and 15 weight % of fluoroethylene carbonate to the stock solution.

Comparative Example 5

Comparative Example 5 was prepared in the same manner as Example 1, except for the addition of 3 weight % of difluoroethylene carbonate and 0.1 weight % of fluoroethylene carbonate to the stock solution.

Average Capacity

The batteries prepared according to Examples 1 to 7 and Comparative Examples 1 to 5 were charged for 3 hours under a condition of 0.5 C/4.2V of constant current and constant voltage. The relative capacities are shown in Table 1.

300 Cycle Capacity (%)

The batteries prepared according to Examples 1 to 7 and Comparative Examples 1 to 5 were charged for 3 hours at a temperature of 25° C. under a condition of 1 C/4.2V of constant current and constant (upper limit) voltage, and then discharged under a condition of 1 C/3V of constant current (and lower limit voltage). After 300 repetitions of this process, the capacity maintenance rate (%) at the 300$^{th}$ cycle was calculated. The results are shown in Table. 1.

Figure 2:
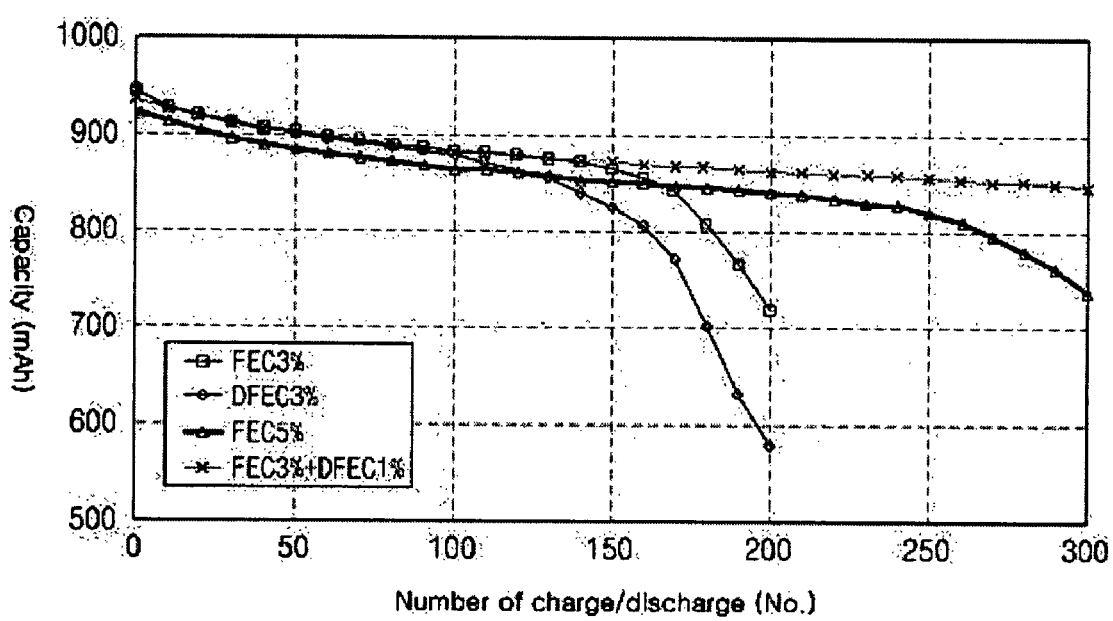
FIG. 2 illustrates a graph of the lifetime characteristics of the Examples and Comparative Examples.

The capacity of each lithium rechargeable battery prepared according to Example 3 and Comparative Examples 1, 2 and 3 was measured per 10 times at the normal temperature cycle up to 300 cycles, and the results are shown in the graph in FIG. 2.

The characteristics represented by the 300 cycle capacity in Table 1 and the graph in FIG. 2 show the lifetime characteristics of the Examples and Comparative Examples.

−20° C. Discharge Capacity

The batteries prepared according to Examples 1 to 7 and Comparative Examples 1 to 5 were charged for 3 hours at a normal temperature of 25° C. under 0.5 C/4.2V of constant current and constant voltage, kept for 4 hours at a temperature of 0° C., and then discharged under 0.5 C/3V of constant current. Table 1 shows the discharge after storage at a low temperature (low temperature discharge characteristic).

TABLE 1

|  | DFEC (weight %) | FEC (weight %) | Average capacity (%) | 300 Cycle capacity (%) | −20° C. Discharge capacity (%) |
| --- | --- | --- | --- | --- | --- |
| Example 1 | 0.5 | 1 | 100 | 60 | 58 |
| Example 2 | 0.5 | 10 | 100 | 92 | 37 |
| Example 3 | 1 | 3 | 100 | 90 | 55 |
| Example 4 | 1 | 5 | 100 | 91 | 46 |
| Example 5 | 1 | 7 | 100 | 92 | 41 |
| Example 6 | 2 | 3 | 99 | 90 | 52 |
| Example 7 | 2 | 5 | 99 | 92 | 48 |
| Comp. Ex. 1 | 3 | 0 | 98 | 30 | 37 |
| Comp. Ex. 2 | 0 | 3 | 100 | 50 | 40 |
| Comp. Ex. 3 | 0 | 5 | 100 | 80 | 38 |
| Comp. Ex. 4 | 0.1 | 15 | 100 | 91 | 5 |
| Comp. Ex. 5 | 3 | 0.1 | 98 | 30 | 32 |

DFEC: difluoroethylene carbonate,
FEC: fluoroethylene carbonate

The above-described results demonstrate that electrolytes according to the Examples, in which about 0.1 to about 2 weight % of difluoroethylene carbonate and about 0.1 to about 10 weight % of fluoroethylene carbonate were used, show superior lifetime and low temperature characteristics as compared to those of the Comparative Examples.

In Example 1, the total addition amount of difluoroethylene carbonate and fluoroethylene carbonate was 1.5 weight %. In this case, the lifetime characteristic was lowered but the low temperature characteristic was raised to 58%. In Example 2, the total addition amount was 10.5 weight %. In this case, the lifetime characteristic was very good (92%) while the low temperature characteristic was lowered to 37%

The use of more than about 10 weight % of halogenated ethylene carbonate may provide diminishing returns in terms of lifetime improvement and may impact the low temperature discharge characteristic. Good effects may be achieved by the use of about 3 to about 5 weight % of the halogenated ethylene carbonate.

Further, if both the dihalogenated ethylene carbonate and halogenated ethylene carbonate are used, and the total amount of the dihalogenated ethylene carbonate and halogenated ethylene carbonate is at a certain level, e.g., about 3 to about 5 weight %, the lifetime characteristic may be good and, by adjusting the relative ratios of the two materials, both good lifetime characteristics and good low temperature characteristics may be achieved. Embodiments therefore provide an electrolyte for a lithium rechargeable batteries which may exhibit superior lifetime characteristics and low temperature discharge characteristics.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An electrolyte for a lithium ion rechargeable battery, comprising:
   a lithium salt;
   a non-aqueous organic solvent;
   a first compound that is a dihalogenated ethylene carbonate; and
   a second compound that is a halogenated ethylene carbonate, wherein:
   the electrolyte includes about 0.01 to about 2 weight % of the dihalogenated ethylene carbonate based on 100 weight % of the non-aqueous organic solvent, and
   the electrolyte includes about 0.1 to about 10 weight % of the halogenated ethylene carbonate based on 100 weight % of the non-aqueous organic solvent.

2. The electrolyte as claimed in claim 1, wherein the electrolyte includes about 0.5 to about 1.5 weight % of the dihalogenated ethylene carbonate.

3. The electrolyte as claimed in claim 2, wherein the electrolyte includes about 3 to about 5 weight % of the halogenated ethylene carbonate.

4. The electrolyte as claimed in claim 1, wherein the dihalogenated ethylene carbonate is difluoroethylene carbonate.

5. The electrolyte as claimed in claim 4, wherein the halogenated ethylene carbonate is fluoroethylene carbonate.

6. The electrolyte as claimed in claim 5, wherein the lithium salt is LiPF$_6$.

7. The electrolyte as claimed in claim 1, wherein a weight ratio of the dihalogenated ethylene carbonate to the halogenated ethylene carbonate is about 1:1 to 1:10.

8. The electrolyte as claimed in claim 1, wherein the dihalogenated ethylene carbonate is a compound of Structure 2:

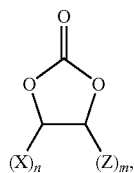

[Structure 2]

where X and Z are independently Cl, F, Br or I, and n and m are independently 1 or 2.

9. The electrolyte as claimed in claim 8, wherein the halogenated ethylene carbonate is a compound of Structure 1:

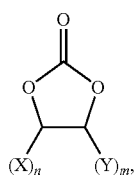

[Structure 1]

where X is Cl, F, Br or I, Y is H, and n and m are independently 1 or 2.

10. A lithium ion rechargeable battery, comprising:
an anode having an anode-active material;
a cathode having a cathode-active material; and
a housing enclosing an electrolyte, the anode and the cathode, the electrolyte including:
a lithium salt;
a non-aqueous organic solvent;
a first compound that is a dihalogenated ethylene carbonate; and
a second compound that is a halogenated ethylene carbonate, wherein:
the electrolyte includes about 0.01 to about 2 weight % of the dihalogenated ethylene carbonate based on 100 weight % of the non-aqueous organic solvent, and
the electrolyte includes about 0.1 to about 10 weight % of the halogenated ethylene carbonate based on 100 weight % of the non-aqueous organic solvent.

11. The battery as claimed in claim 10, wherein the electrolyte includes about 0.5 to about 1.5 weight % of the dihalogenated ethylene carbonate.

12. The battery as claimed in claim 11, wherein the electrolyte includes about 3 to about 5 weight % of the halogenated ethylene carbonate.

13. The battery as claimed in claim 10, wherein the dihalogenated ethylene carbonate is difluoroethylene carbonate.

14. The battery as claimed in claim 13, wherein the halogenated ethylene carbonate is fluoroethylene carbonate.

15. The battery as claimed in claim 14, wherein the lithium salt is $LiPF_6$.

16. The battery as claimed in claim 10, wherein a weight ratio of the dihalogenated ethylene carbonate to the halogenated ethylene carbonate is about 1:1 to 1:10.

17. The battery as claimed in claim 10, wherein the dihalogenated ethylene carbonate is a compound of Structure 2:

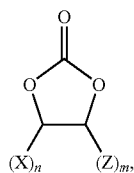

[Structure 2]

where X and Z are independently Cl, F, Br or I, and n and m are independently 1 or 2.

18. The battery as claimed in claim 17, wherein the halogenated ethylene carbonate is a compound of Structure 1:

[Structure 1]

where X is Cl, F, Br or I, Y is H, and n and m are independently 1 or 2.

* * * * *